350-357
4/20/82 XR 4,326,007

United States Patent [19] [11] 4,326,007
Williams et al. [45] Apr. 20, 1982

[54] ELECTO-LUMINESCENT STRUCTURE

[75] Inventors: Ferd E. Williams; David C. Morton, both of Newark, Del.

[73] Assignee: University of Delaware, Newark, Del.

[21] Appl. No.: 142,043

[22] Filed: Apr. 21, 1980

[51] Int. Cl.[3] .......................... B32B 33/00; H01J 1/63

[52] U.S. Cl. .................................... 428/333; 250/462; 313/503; 350/357; 427/66; 428/336; 428/446; 428/448; 428/450; 428/690; 428/691

[58] Field of Search .................. 427/66; 428/917, 333, 428/336, 446, 448, 450, 690, 691, 702; 313/502, 503; 350/357; 250/462

[56] References Cited

U.S. PATENT DOCUMENTS 3,650,824 3/1972 Szepesi et al. .................. 428/917 X

FOREIGN PATENT DOCUMENTS 1543233 3/1979 United Kingdom ........... 428/917 X

*Primary Examiner*—Bruce H. Hess

[57] ABSTRACT

An electro-luminescent structure comprising a laminar composite made up of pairs of semi-insulator films fabricated from substances developing high energy electrons when subjected to an electrical voltage each in association with phosphor films luminescing under electron impact from the semi-insulators.

1 Claim, 5 Drawing Figures

ELECTO-LUMINESCENT STRUCTURE

GENERAL

The research culminating in this invention was conducted, in part, under Contract DAAG 29-79-G-0035 with the U.S. Army Research Office—Durham, pursuant to which the Government possesses certain property rights.

BACKGROUND OF THE INVENTION

A survey of the current status of luminescence research was published by Ferd Williams in Jan., 1979, entitled "New Trends in Luminescence Research", Journal of Luminescence 18/19 (1979) pp. 941-946, North-Holland Publishing Company. The applicants have disclosed some details of their instant invention in an article entitled "A New Thin-Film Electroluminescent Material—$ZnF_2$:Mn", published by the American Institute of Physics in *Applied Physics Letters* 35 (9), Nov. 1, 1979.

High-field collision excitation electroluminescence (EL) has become a current area of active research as a result of the application of thin-film technology to form relatively stable EL devices with power efficiencies approaching 1% and with hysteresis in the brightness-voltage characteristic permitting information storage as well as display, as disclosed by T. Inoguchi and S. Mito in *Topics in Applied Physics,* edited by J. Pankove (publisher Springer, Heidelberg, 1977), Vol. 17, Chapter 6, p. 202. The major research has involved evaporated ZnS:Mn sandwiched between sputtered or electron-beam evaporated $Y_2O_3$, as taught by V. Marrello, W. Rühle, and A. Onton in *Applied Physics Letters,* 31, p. 452 (1977) and J. M. Hurd and C. N. King in *J. Electron. Mater.* Vol. 8, No. 6 pages 879-890 (1979). Similar devices have been made with ZnSe:Mn, refer J. Shak and A. E. DiGiovanni, *Applied Physics Letters,* 33, p. 995 (1978). Related work has beem reported on crystals of $CdF_2$:Mn in MIS structures, refer T. Langer, B. Krukowska-Fulde, and J. M. Langer, *Applied Physics Letters,* 34, p. 216 (1979). Finally, EL has been studied with rare earth dopants in place of Mn in these materials, as described by J. Benoit, P. Bennalloul, R. Parrot and J. Mattler, *J. Lumin.,* 18/19, p. 739 (1979). In all of the foregoing, a high temperature postgrowth anneal is required.

SUMMARY OF THE INVENTION

This invention comprises a laminar electroluminescent structure incorporating a thin semi-insulator layer capable of producing relatively high energy electrons upon imposition of a voltage thereacross and, contiguous to the semi-insulator layer and in surface contact threwith, a thin phosphor layer receiving high energy electrons from the semi-insulator layer and luminescing by excitation due to impact of the high energy electrons derived from the semi-insulator layer, and electrodes bonded to the outboard surfaces of the semi-insulator layer and the phosphor layer for applying an electrical voltage across the structure.

DRAWINGS

The following drawings constitute part of this disclosure, in which:

FIG. 1 is a side elevation cross-sectional view of a preferred embodiment of this invention incorporating a phosphor layer sandwiched between two semi-insulator layers, FIG. 2 is a side elevation cross-sectional view of a preferred embodiment of this invention incorporating two isolated phosphor layers separated one from the other by a central semi-insulator layer, the composite being then sandwiched between top and bottom semi-insulator layers, FIG. 3 is a typical plot of phosphor layer thickness on the abscissa v. brightness on the ordinate for the structure of FIG. 1, FIG. 4 is a typical plot of wavelength on the abscissa v. intensity on the ordinate for the structure of FIG. 1, and FIG. 5 is a typical plot of total SiO thickness on the abscissa v. electric field on the ordinate for the structure of FIG. 1 to obtain constant brightness.

DETAILED DESCRIPTION OF THE INVENTION

Figure 1:
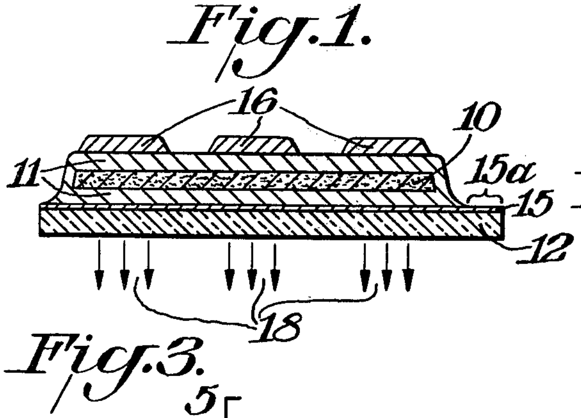

Referring to FIG. 1, there is shown a preferred laminar electro-luminescent structure according to this invention in which the phosphor layer 10 is $ZnF_2$:Mn, wherein said Mn is present in relatively small porportion, e.g., 1% and functions as a dopant for the $ZnF_2$. Layer 10 is typically 150 to about 5000 Å thick. $ZnF_2$ has a rutile structure and is a weakly N-type semiconductor with low electron mobility [refer J. H. Crawford and F. E. Williams, *J. Chem. Phys.* 18, p. 775 (1950).]

As taught by F. E. Williams, one of the instant applicants, in *J. Opt. Soc. Am.,* 37, p. 302 (1947), $ZnF_2$:Mn is unique among luminescent materials in being capable of rather coefficient cathodoluminescence in the form of transparent thin films formed by vacuum evaporation. No postdeposition anneal is needed. Moreover, its lower refractive index minimizes the internal trapping of the emission, which reduces substantially the efficiency of ZnS thin films.

Attempts have been made to use powdered form phosphors for display systems and low level illumination. Unfortunately, it has been found that such devices display poor stability in the electric field and, consequently, short lifetimes, apparently due to inhomogeneities in the phosphor powder. Our phosphors are deposited as unitary thin films by vapor deposition, giving very good stabilities and operating lifetimes of, typically, 1000 hrs.

In the design of FIG. 1 phosphor layer 10 is sandwiched between two semi-insulator SiO layers 11, also laid down by vapor deposition, which also seal the ends of the phosphor layer against atmospheric exposure. Layers 11 are, typically, 500 to about 7000 Å thick.

Figure 2:
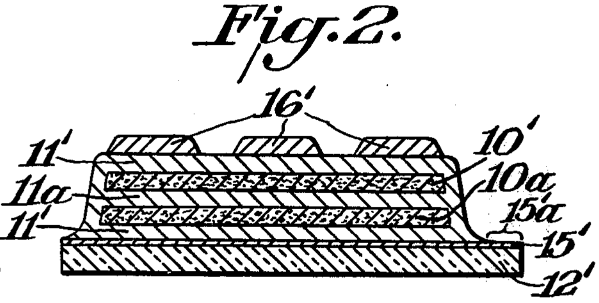

The substrate of the laminer structure can be a layer of electrically conducting glass 12, bonded to the lower semi-insulator 11. This can conveniently comprise the Corning Co. product consisting of an integral composite of a #7059 glass coated on the side adjacent the lower layer 11 of semiconductor with a layer of electrically conductive $Sn_2O_4$ denoted 15 of a thickness displaying a resistance of approximately 100 ohms per square. As shown in FIGS. 1 and 2, a portion of layer 15, denoted area 15*a,* extends outside the semi-insulator-phosphor sandwich, thereby affording a seat for attachment of the second exterior electrode (not shown) of the structure.

It should be mentioned that all of the layers of the structure of FIG. 1 are quite transparent to visible radiation, e.g., about 50 percent.

The structure is completed by the addition of vapor-deposited aluminum metal electrodes, 16, typically, greater than 2000 A thick.

In operation, it appears that when a voltage (either d.c. or a.c.) of sufficient magnitude, typically, $4\times10^5$ v/cm thickness, is applied across the structure of FIG. 1, relatively highly energetic electrons are generated, which impact the atoms of phosphor layer 10, thereby causing the phosphor to luminesce, whereupon visible radiation is emitted from conductive glass layer 12 as denoted by the arrows 18.

Figure 3:
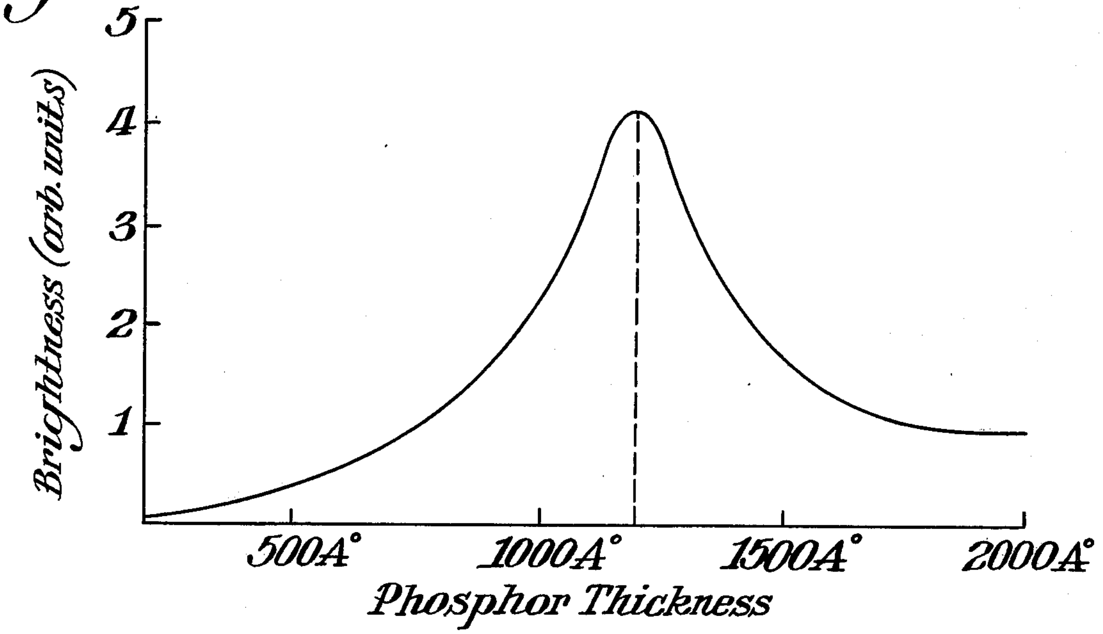

As shown in FIG. 3, the brightness (in arbitrary units) of luminescent radiation as a function of phosphor layer 10 thickness in the structure of FIG. 1 (for both d.c. and a.c. operation) is a maximum at a thickness of approximately 1200 A; however, substantial light output is achieved over a relatively wide range of thicknesses to either side of the maximum.

Figure 4:
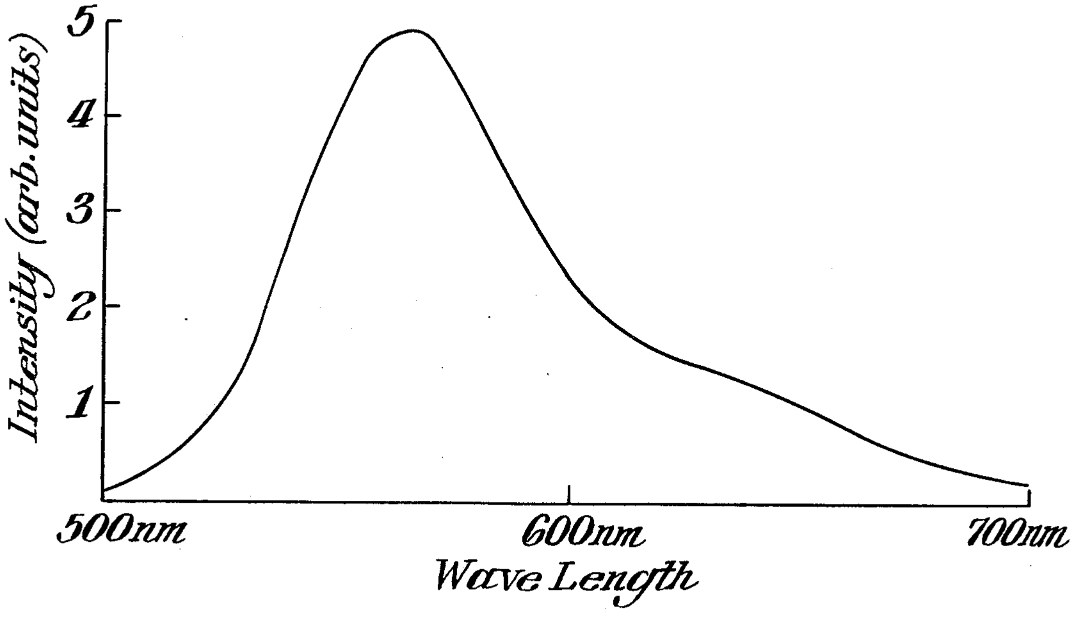

As shown in FIG. 4, the intensity (in arbitrary units) of luminescent radiation as a function of wavelength is in the range of about 560–570 nanometer (nm) for a thickness of phosphor layer 10 of about 1200 Å. The visibly perceptive radiation 18 is variously sensed as yellow-green to reddish orange, which is highly effective for information display. By appropriately preselecting the thickness of phosphor layer 10, the maximum of emission plotted in FIG. 4 can be shifted over the range of about 560 nm to 615 nm for $ZnF_2$:Mn phosphor specifically.

Figure 5:
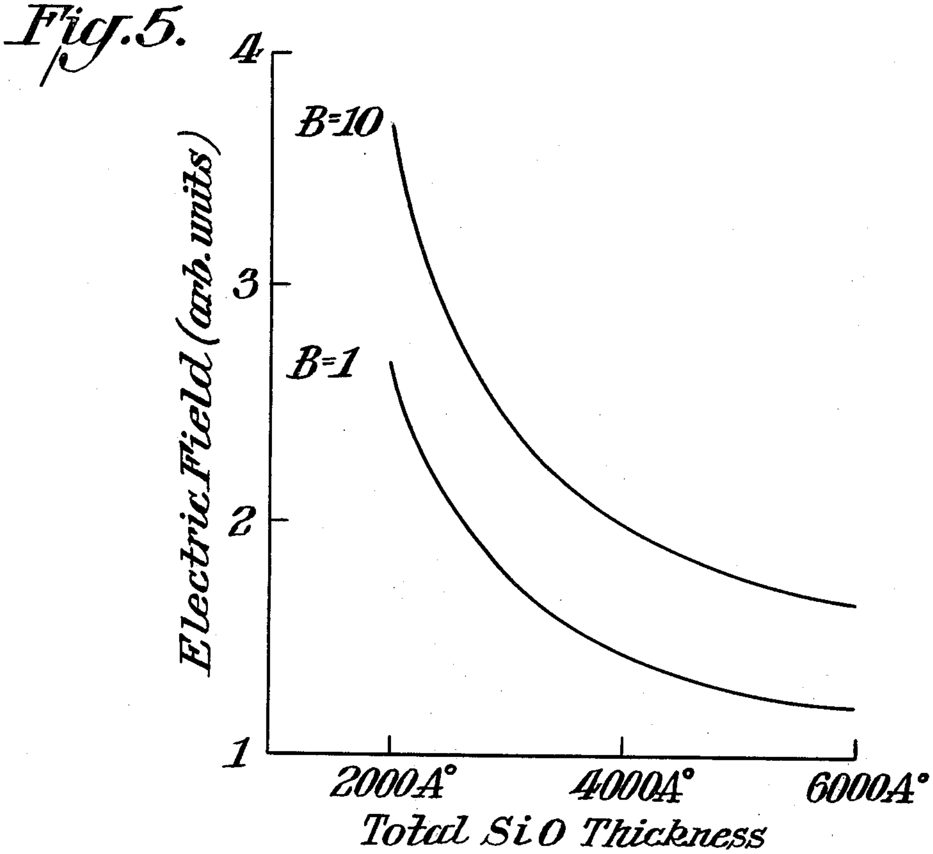

Referring to FIG. 5, the variation of electric field (in arbitrary units, with total SiO thickness (Å) for the structure of FIG. 1 in both a.c. and d.c. operation is as shown for the constant brightnesses B=1 and B=10.

We have found that normal samples of FIG. 1 structure commence luminescence at voltage applications of about 40 volts, without appreciable delay in light up. Light generation is very uniform.

While $ZnF_2$:Mn is preferred as a phosphor layer 10 (because of its high light output), other substances such as $CaF_2$:Mn, ZnS:Ag and ZnS:Mn are possible substitutes. In addition, certain compounds formed from elements in Groups 2b and 6a of the Periodic Table, such as ZnTe, ZnSe, ZnS, ZnO, CdTe, CdSe and CdS are considered to be candidates for the phosphor layer 10 of this invention.

It is practicable to employ multiple layers to both phosphor and semi-insulator in a single unitary structure with the advantage of enhanced light output, and such a design is shown in FIG. 2 wherein the same reference numerals, with primes appended, correspond generally to the same components in FIG. 1.

In FIG. 2 a second layer **10*a* is incorporated in vertical alignment with phosphor layer 10', separated therefrom by a layer of SiO semi-insulator 11*a*, which latter can have a thickness in the same range as the layers 11 and 11'**.

If desired, the interleaved structure of FIG. 2 can be expanded to accommodate three or even more phosphor layers, each separated from its neighbors by layers of semi-insulator. We have found that structures incorporating from one to ten pairs of semi-insulator and phosphor layers are entirely functional, one additional semi-insulator being utilized to complete the composite in all cases.

The term "semi-insulator", as used herein and in the claims, refers to substances having lower conductivities than those of semiconductors. For example, $ZnF_2$:Mn is a semiconductor, and it has a conductivity about two times greater than that of SiO. Moreover, semi-insulators are not doped, as distinguished from semiconductors. In brief, the semi-insulator chosen for association with a given phosphor should develop maximum voltage drop across the semi-insulator as compared with the phosphor layer.

While SiO is preferred as a semi-insulator, other substances can be substituted, MnO being a specific example. In addition, reduced $TiO_2$ is a suitable material. [Reduced $TiO_2$ is produced by heating $TiO_2$ in a $H_2$ atmosphere until the resistance attains $10^5$ ohms/cm$^2$].

The advantage obtained through use of aluminum electrodes 16 is that their undersurfaces are bright enough to function as mirrors, thereby reflecting radiation back toward glass plate 12, thus enhancing the device light output. Of course, some light escapes from the sides of the structure, but this is minimal.

In use as an information display device, electrodes 16 can be formed into a multiplicity of discrete contacts to which voltage is applied in selective pattern, whereupon a corresponding electrical circuit is completed through the semi-insulator, phosphor composite via $Sn_2O_4$ conductive layer 15 and area **15*a***, to which latter an electrical lead (not shown) is attached. This produces an electroluminescent output in a pattern imparting the information desired. A variety of other information display circuitry is known in the art and, accordingly, this aspect is not further described herein.

Electroluminescent structures as hereinbefore described were prepared as follows, using a commercial Consolidated Vacuum Corporation resistive evaporation system. This apparatus is provided with an 18 inch diameter bell jar having three evaporation stations, a 2KVA a.c. filament heating element and a 4" pumping station, inclusive of a gate valve, liquid nitrogen trap, 4" diffusion pump, roughing and holding pumps. Conditions inside the bell jar were monitored with a CVC type GPH-100 c discharge vacuum gage and CVC type GTC-110 thermocouple gauges on the backing and roughing lines.

Thickness measurements of the evaporated layers were made with a Sloan model DTM-3 deposit thickness monitor, stated accuracy ±2%. Frequency measurements were made with a Hewlett Packard 522B electronic counter.

The applicable formula for calculation of the thickness of the evaporated layer is:

$$T=2\times\Delta f/\rho,$$

where T=thickness in angstroms, Δf is the change in beat frequency and ρ is the bulk density of material being evaporated. It should be observed that the formula is only approximately correct due to vagaries in vacuum deposition and the assumption that film density is always equal to bulk density. Thus, a few random checks with an interferometer microscope disclosed that Sloan thickness yields of 12,000 Å total thickness ±240 Å, can correspond to interferometer yields of 11,800 Å±750 Å.

Using appropriate sequential masking, typical devices were made in the following order with symmetric MIS structure: conductive glass substrate, $Sn_2O_4$, SiO, $ZnF_2$:Mn, SiO and Al.

The Corning Company conduction glass 2"×2" size substrates, supra, had a typical flatness of 0.004"/inch, ±20 ohm surface resistance, the optical transmission of the $Sn_2O_4$ being greater than 90% at 585 nm.

The SiO was Union Carbide select grade vacuum outgassed 120/320 mesh, obtained from R. D. Mathis Company, having a purity greater than 99.99% as regards all trace metals. A baffled SM-10 SiO source was used for the evaporation, which was also procured from R. D. Mathis Company.

Zinc fluoride and manganese were Ventron Company, Alfa Division products having a 99%+ purity. The powders were mixed by weight on a Mettler balance, sintered in a platinum crucible at 800° C. for 30 minutes, ground to powder and sealed until loaded into the evaporator. Triboluminescence was observed during grinding of the powder. The $ZnF_2$:Mn was evaporated from a cavity in a platinum plug which was heated by a tungsten basket.

The aluminum was procured from A. D. Mackay, Incorporated, purity 99.999% and was evaporated from a tungsten basket.

Selected edges of the substrate were masked to provide electrical contact with the $Sn_2O_4$. The aluminum was evaporated through one of two masks giving either a pattern of nine 0.5" diameter spots, or two 0.5" diameter spots and two 0.875" diameter spots.

The aluminum was melted and the SiO and $ZnF_2$:Mn were outgassed before the substrate was moved over the sources for the evaporation.

A typical sample preparation was as follows:

The chamber was rough pumped to 10 microns and then backfilled with argon. The chamber was again rough pumped to 10 microns and then switched to the diffusion pump until the pressure was less than $7\times10^{-6}$ torr. Then the SiO was outgassed for 15 minutes at approximately 800° C.

The temperature was increased until the SiO was evaporating, at which point the substrate was positioned and SiO deposited for 4 minutes, yielding a film 5000 Å thick.

The $ZnF_2$:Mn was outgassed for 45 minutes at approximately 450° C. and the temperature slowly increased, with the substrate moved into position until the $ZnF_2$:Mn was evaporating. Evaporating for 2 minutes yielded a film 2000 Å thick.

After waiting 20 minutes, the SiO was outgassed for 6 minutes at 800° C., after which the temperature was increased until the SiO was evaporating, when the substrate was positioned over the source. Evaporating for 4 minutes yielded a film 5000 Å thick. After waiting 20 minutes the aluminum was heated until molten, after which the substrate was moved into position and the temperature increased until aluminum evaporated, which was continued until the source basket was no longer visible through the substrate.

After waiting one hour, the diffusion pump was shut off.

The substrate temperature, as measured, was never higher than 20° C. above room temperature. Pressure during the evaporations was always less than $2\times10^{-5}$ torr, and normally was $8.5\times10^{-6}$ torr. All evaporations were in an up direction and the source-to-substrate distance was 12 inches.

What is claimed is:

1. A laminar electroluminescent structure comprising a semi-insulator layer consisting essentially of silicon monoxide having a thickness in the range of about 500 Å to about 1000 Å capable of producing relatively high energy electrons upon imposition of a voltage thereacross and, contiguous to said semi-insulator layer and in surface contact therewith, a phosphor layer consisting essentially of $ZnF_2$:Mn having a thickness in the range of about 150 Å to about 5000 Å receiving high energy electrons from said semi-insulator layer and luminescing by excitation due to impact of said high energy electrons derived from said semi-insulator layer, and electrodes on the outboard surfaces of said semi-insulator layer and said phosphor layer for applying an electrical voltage across said structure.

* * * * *